US012532095B2

(12) United States Patent
Xiao et al.

(10) Patent No.: US 12,532,095 B2
(45) Date of Patent: Jan. 20, 2026

(54) MULTIFUNCTIONAL SOUNDING DEVICE

(71) Applicant: AAC Microtech (Changzhou) Co., Ltd., Jiangsu (CN)

(72) Inventors: Bo Xiao, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 182 days.

(21) Appl. No.: 18/605,781

(22) Filed: Mar. 14, 2024

(65) Prior Publication Data

US 2025/0203256 A1 Jun. 19, 2025

Related U.S. Application Data

(63) Continuation of application No. PCT/CN2023/139045, filed on Dec. 15, 2023.

(51) Int. Cl.
*H04R 1/02* (2006.01)

(52) U.S. Cl.
CPC .................................... *H04R 1/02* (2013.01)

(58) Field of Classification Search
CPC . H04R 1/025; H04R 1/06; H04R 1/44; H04R 2209/022; H04R 2400/11; H04R 3/00; H04R 7/04; H04R 7/127; H04R 7/18; H04R 9/025; H04R 9/043; H04R 9/045; H04R 9/06; H04R 9/047; H04R 9/063; H04R 1/24; H04R 7/16; H04R 1/02; H04R 7/045; H04R 2499/11; H04R 2400/07; H04R 2209/026; H04R 2400/03
USPC ................................ 381/400–412, 386, 398
See application file for complete search history.

(56) References Cited

U.S. PATENT DOCUMENTS 12,052,557 B2 * 7/2024 Jin ........................... H04R 9/06
2023/0328427 A1 * 10/2023 Jin ......................... H04R 1/026 381/345
2023/0328441 A1 * 10/2023 Jin ........................... H04R 1/02
2023/0328442 A1 * 10/2023 Jin ....................... H04R 1/2811 381/412

FOREIGN PATENT DOCUMENTS

CN 218830621 U * 4/2023 ............... H04R 9/02

* cited by examiner

*Primary Examiner* — Carolyn R Edwards
*Assistant Examiner* — Julie X Dang
(74) *Attorney, Agent, or Firm* — Wiersch Law Group

(57) ABSTRACT

The present application provides a multifunctional sounding device including a housing with an accommodating cavity and a sounding driver including a basket frame, a vibration system fixed to the basket frame, and a magnetic circuit system configured to drive the vibration system to vibrate along a first direction to generate sound. The multifunctional sounding device further includes a coil configured to drive the sounding driver to vibrate along the second direction, an elastic connecting member, and a flexible sealing film. The housing includes an upper cover body, a lower cover body, and a side wall. The side wall is provided with a sound-emitting hole. The flexible sealing film includes an annular body portion and an extension portion. The solution employs a method of vertically arranging the sealing film, thereby simplifying the molding and assembly process of the sealing film while achieving dual functionality of sound playback and vibration feedback.

8 Claims, 3 Drawing Sheets

MULTIFUNCTIONAL SOUNDING DEVICE

CROSS-REFERENCE TO RELATED APPLICATIONS

This application is a continuation of International Application No. PCT/CN2023/139045, filed on Dec. 15, 2023, the entire contents of which are incorporated herein by reference.

TECHNICAL FIELD

The present application relates to the field of electronic technology equipment, in particular to a multifunctional sounding device.

BACKGROUND

With the development of electronic technology, portable consumer electronic devices are becoming more and more sought after, such as smartphones, handheld game consoles, and tablet computers. These electronic devices generally interact with users through sound playback and vibration sensing.

In the prior art, the sound playback and vibration sensing of the electronic devices are accomplished through speakers and motors, respectively, wherein the speakers and motors are independent devices. The more devices there are, the less favorable it is to the assembly of the electronic device, and at the same time, it needs to occupy more internal space of the electronic device.

Therefore, it is necessary to provide a new multifunctional sounding device to solve the above technical problems.

SUMMARY

An object of the present application is to provide a multifunctional sounding device with a sounding driver that can have larger dimensions, and effectively improve acoustic performance.

The present application provides a multifunctional sounding device comprising:

- a housing with an accommodating cavity, comprising:
  - an upper cover body;
  - a lower cover body arranged opposite to the upper cover body; and
  - a side wall connecting the upper cover body and the lower cover body, and provided with a sound-emitting hole;
- a sounding driver accommodated in the accommodating cavity, comprising:
  - a basket frame;
  - a vibration system fixed to the basket frame; and
  - a magnetic circuit system configured to drive the vibration system to vibrate along a first direction to generate sound;
- a coil fixed to the housing and configured to drive the sounding driver to vibrate along a second direction, wherein the first direction is perpendicular to the second direction;
- an elastic connecting member suspending the sounding driver to the housing; and
- a flexible sealing film provided between the sounding driver and the housing, comprising:
  - an annular body portion provided between the upper cover body and the sounding driver; and
  - an extension portion extending from the annular body portion to connect the sound-emitting hole.

In some embodiments, the annular body portion of the flexible sealing film forms a front cavity between the upper cover body and the sounding driver, and the extension portion forms a sound-emitting channel communicated with the sound-emitting hole.

In some embodiments, the flexible sealing film is made of silicone or hydrogenated styrene-butadiene block copolymer.

In some embodiments, the multifunctional sounding device further comprises an upper fixing ring provided between the annular body portion and the upper cover body, and/or a lower fixing ring provided between the annular body portion and the sounding driver, and/or an outer fixing ring provided between the extension portion and the sound-emitting hole.

In some embodiments, the magnetic circuit system comprises a first main magnetic steel, a second main magnetic steel arranged above the first main magnet, and a sub-magnetic steel forming a magnetic gap with the first main magnetic steel and the second main magnetic steel; and the vibration system comprises a diaphragm and a voice coil arranged in the magnetic gap and configured to drive the diaphragm to vibrate to generate sound.

In some embodiments, the magnetic circuit system further comprises a magnetic yoke configured to support the first main magnetic steel, the second main magnetic steel, and the sub-magnetic steel, and the magnetic yoke comprises an opening provided to avoid the coil.

In some embodiments, the multifunctional sounding device further comprises a magnet provided on a side of the coil away from the sub-magnetic steel, wherein the magnet is fixed to the magnetic yoke.

In some embodiments, the multifunctional sounding device further comprises a circuit board and an auxiliary diaphragm arranged below the circuit board.

The multifunctional sounding device of the present application can enlarge the size of the sounding driver within the same finished product dimensions, effectively enhancing the acoustic performance of the sounding device. Additionally, when the sounding driver vibrates as a vibrator along the second direction, the flexible sealing film can undergo deformation in the horizontal direction, meeting the horizontal vibration function of the sounding driver.

BRIEF DESCRIPTION OF THE DRAWINGS

In order to more clearly illustrate the technical solutions in the embodiments of the present application, the accompanying drawings that need to be used in the description of the embodiments will be briefly introduced as follows. Obviously, the accompanying drawings in the following description are only some of the embodiments of the present application. For the person of ordinary skill in the field, other accompanying drawings can be obtained based on these drawings without putting forth any creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application rather than all of the embodiments. Based on the embodiments in the present application, all other embodiments obtained by a person of ordinary skill in the art of the present application without making creative labor fall within the protection scope of the present application.

Figure 1:
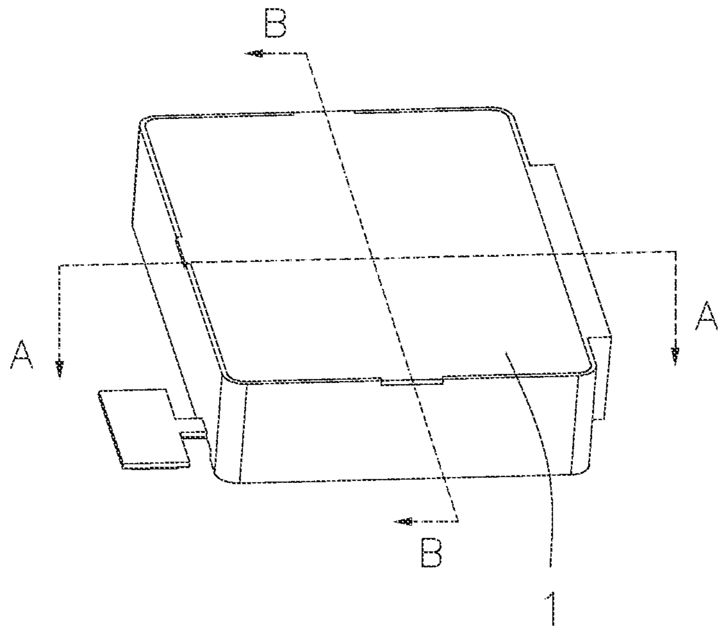
FIG. 1 shows a three-dimensional structural schematic view of a multifunctional sounding device provided by an embodiment of the present application.
Figure 2:
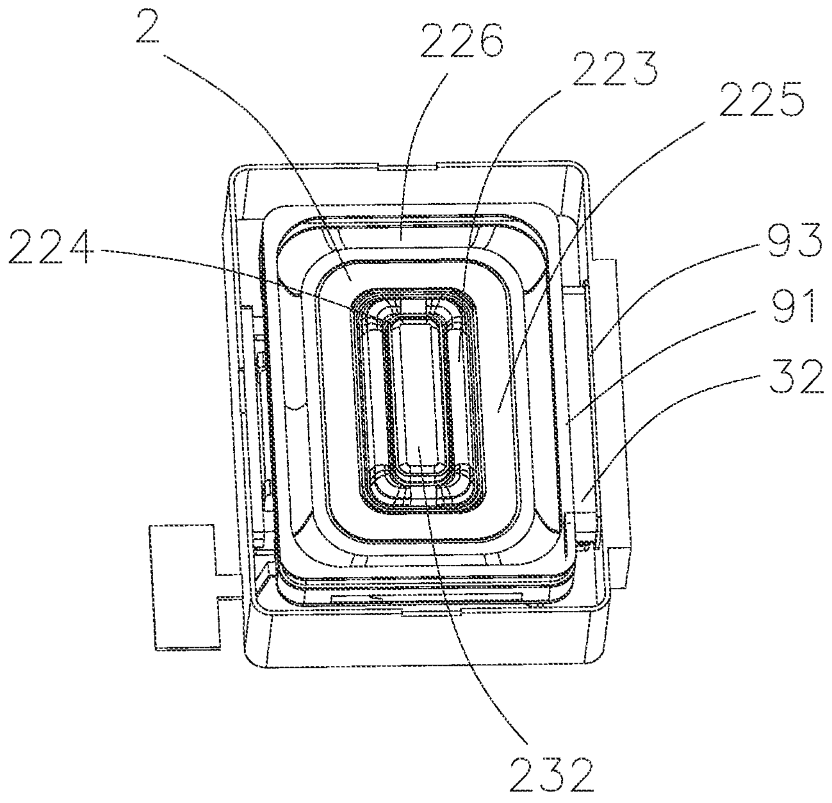
FIG. 2 shows a three-dimensional structural schematic view of the multifunctional sounding device shown in FIG. 1 with an upper cover body removed.
Figure 3:
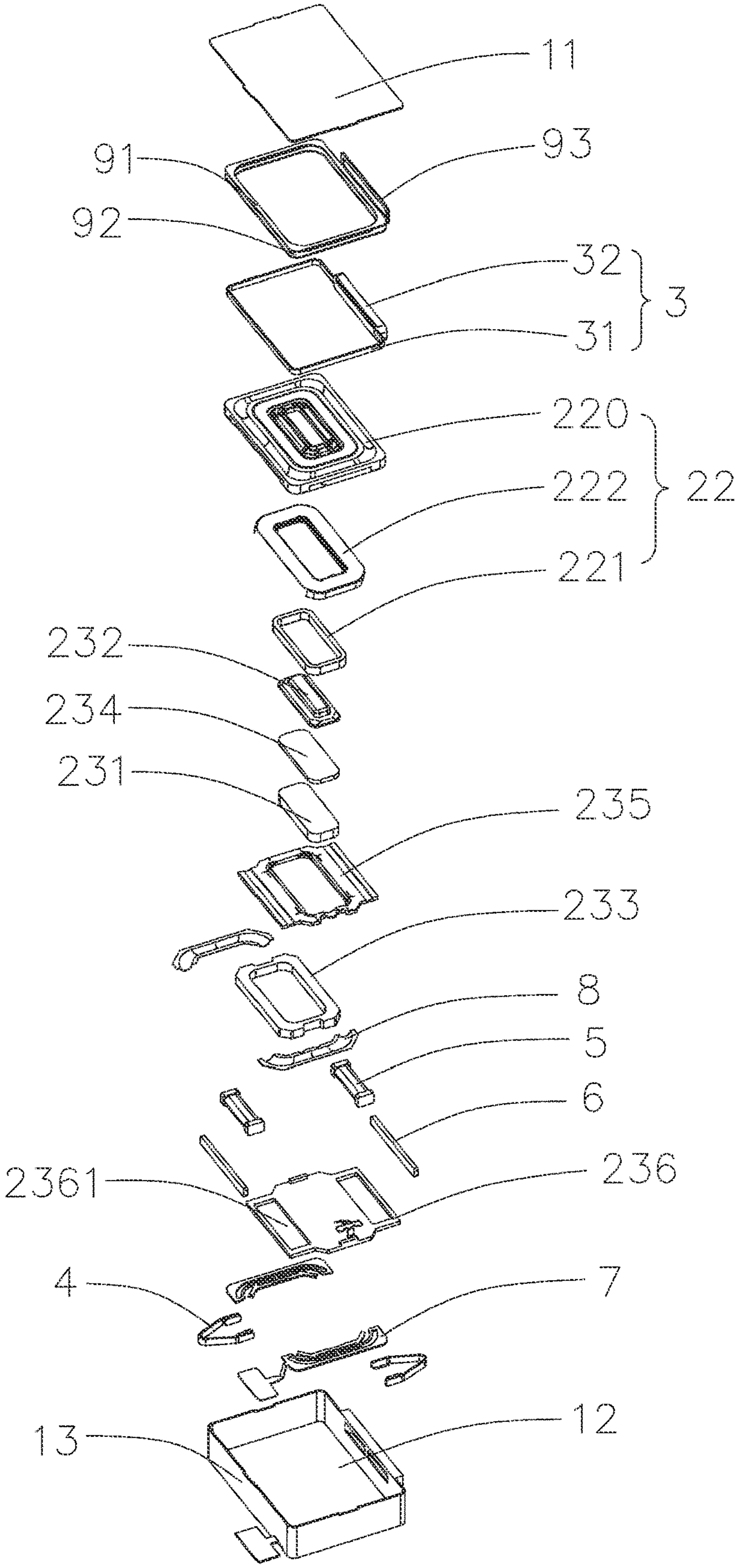
FIG. 3 shows an exploded view of the multifunctional sounding device shown in FIG. 1.
Figure 4:
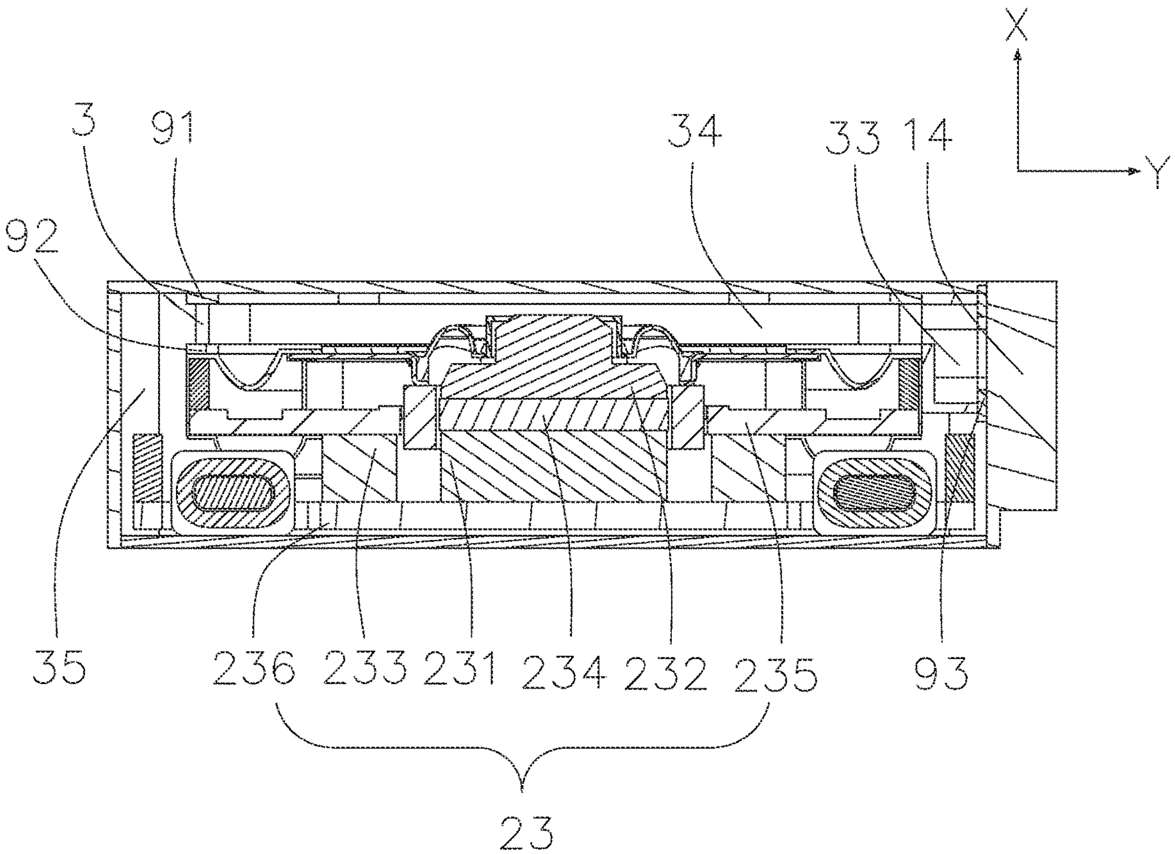
FIG. 4 shows a sectional view of the multifunctional sounding device shown in FIG. 1 along line A-A.
Figure 5:
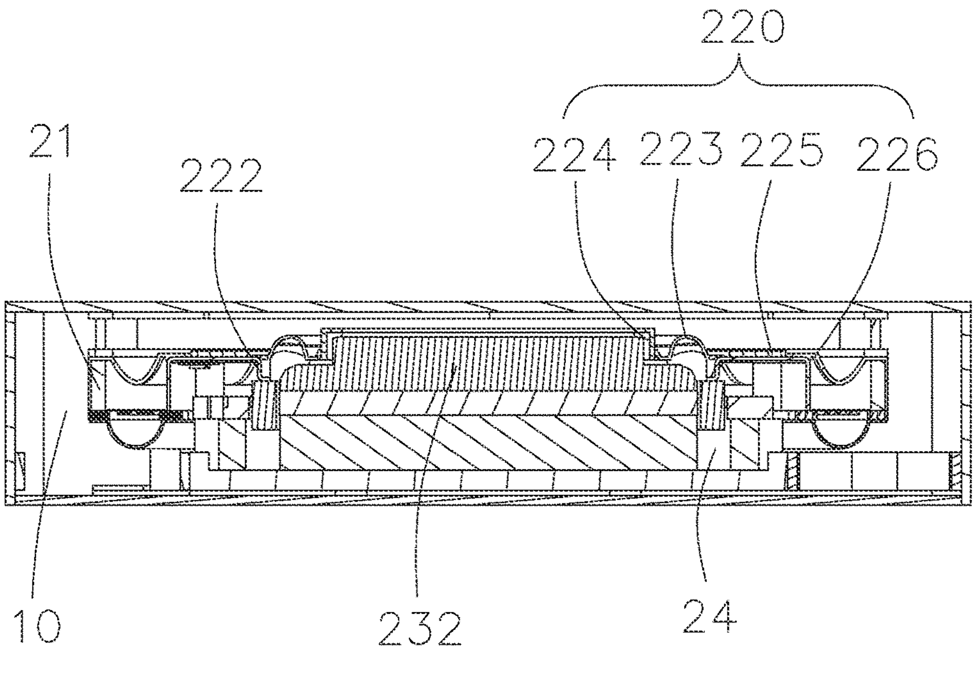
FIG. 5 shows a sectional view of the multifunctional sounding device shown in FIG. 1 along line B-B.

As shown in FIGS. 1-5, the present application provides a multifunctional sounding device 100, and the multifunctional sounding device 100 includes a housing 1, a sounding driver 2 accommodated in the housing 1, a flexible sealing film 3 sandwiched between the housing 1 and the sounding driver 2, and an elastic connecting member 4 suspending the sounding driver 2 to the housing 1. It is defined that a first direction is X, and a second direction is Y, where the first direction X is perpendicular to the second direction Y, and the sounding driver 2 vibrates and produces sound along the first direction X. The multifunctional sounding device 100 includes a coil 5 configured to drive the sounding driver 2 to vibrate along the second direction Y, and a magnet 6 arranged on the side of the coil 5 and fixed to the sounding driver 2. The multifunctional sounding device 100 further includes a circuit board 7 and an auxiliary diaphragm 8.

The housing 1 includes an upper cover 11, a lower cover 12 arranged opposite to the upper cover 11, and a side wall 13 connecting the upper cover 11 and the lower cover 12, where the side wall 13 is provided with a sound-emitting hole 14. The upper cover 11, the lower cover 12, and the side wall 13 form an accommodating cavity 10. The housing 1 in this embodiment is a structure assembled as a separate unit. In other embodiments, the upper cover body 11 and the side wall 13 may be integrally molded or the lower cover body 12 and the side wall 13 may be integrally molded.

The sounding driver 2 includes a basket frame 21, a vibration system 22 fixed to the basket frame 21, and a magnetic circuit system 23 configured to drive the vibration system 22 to vibrate along the first direction X to generate the sound.

The vibration system 22 includes a diaphragm 220, a voice coil 221 configured to drive the diaphragm 220 to vibrate to generate sound, and a skeleton 222 configured to support the diaphragm 220 and the voice coil 221. The diaphragm 220 includes an inner folded ring portion 223, a fixing portion 224 fixed to the inner folded ring portion 223, a dome 225 arranged around the inner folded ring portion 223, and an outer folded ring portion 226 arranged around the dome 225. The skeleton 222 is fixed to the inner folded ring portion 223, the dome 225, and the outer folded ring portion 226.

The magnetic circuit system 23 includes a first main magnet steel 231, a second main magnet steel 232 arranged above the first main magnet steel 231, a sub-magnetic steel 233 forming a magnetic gap 24 with the first main magnet steel 231 and the second main magnet steel 232, a main pole core 234 sandwiched between the first main magnet steel 231 and the second main magnet steel 232, and a sub-pole core 235 arranged above the sub-magnetic steel 233. The sub-pole core 235 is fixed to the basket frame 21, and the second main magnet steel 232 is fixed to the fixing portion 224.

The magnetic circuit system 23 further includes a magnetic yoke 236 configured to support the first main magnet steel 231, the second main magnet steel 232, and the sub-magnetic steel 233. The magnetic yoke 236 is opened with a rectangular opening 2361, and the coil 5 is a solenoid. The coil 5 is fixed to the lower cover body 12 of the housing 1 and is located within the rectangular opening 2361. The magnet 6 is fixed to the magnetic yoke 236.

The flexible sealing film 3 includes an annular body portion 31 sandwiched between the upper cover body 11 and the sounding driver 2, and an extension portion 32 extending from the annular body portion 31 to connect the sound-emitting hole 14. The extension portion 32 forms a sound-emitting channel 33 in communication with the sound-emitting hole 14. A front cavity 34 is formed among the annular body portion 31 of the flexible sealing film 3, the upper cover body 11, and the sounding driver 2. The flexible sealing film 3 divides the accommodating space 10 into the front cavity 34 and the rear cavity 35. The flexible sealing film 3 acts as a seal for the rear cavity 35, and the front cavity 34 is connected to the sound-emitting channel 33. When the sounding driver 2 vibrates as a vibrator in the Y direction, the flexible sealing film 3 deforms in the horizontal direction to satisfy the horizontal vibration function of the sounding driver 2.

The flexible sealing film 3 in this embodiment is made of silicone. In other embodiments, the flexible sealing film 3 may be made of hydrogenated styrene-butadiene block copolymer or other elastic material.

The multifunctional sounding device 100 further includes an upper fixing ring 91 arranged between the annular body portion 31 and the upper cover body 11, a lower fixing ring 92 arranged between the annular body portion 31 and the sounding driver 2, and an outer fixing ring 93 arranged between the extension portion 32 and the sound-emitting hole 14. The upper fixing ring 91, the lower fixing ring 92, and the lower fixing ring 92 can enable the flexible sealing film 3 to be better assembled and fixed.

The multifunctional sounding device in this embodiment includes the upper fixing ring 91, the lower fixing ring 92, and the outer fixing ring 93. In other embodiments, it may only include one of the upper fixing ring 91, the lower fixing ring 92, and the outer fixing ring 93, or it may include the upper fixing ring 91 and the lower fixing ring 92, or the upper fixing ring 91 and the outer fixing ring 93, or the lower fixing ring 92 and the outer fixing ring 93.

Compared to the related art, the present application provides a multifunctional sounding device including a housing with an accommodating cavity and a sounding driver accommodated in the accommodating cavity. The sounding driver includes a basket frame, a vibration system fixed to the basket frame, and a magnetic circuit system configured to drive the vibration system to vibrate along a first direction to generate sound. The multifunctional sounding device further includes a coil fixed to the housing and configured to drive the sounding driver to vibrate along the second direction, an elastic connecting member suspending the sounding driver to the housing, and a flexible sealing film provided between the sounding driver and the housing. The first direction is perpendicular to the second direction. The housing includes an upper cover body, a lower cover body arranged opposite to the upper cover body, and a side wall connecting the upper cover body and the lower cover body. The side wall is provided with a sound-emitting hole. The flexible sealing film includes an annular body portion sandwiched between the upper cover body and the sounding driver, and an extension portion extending from the annular body portion to connect the sound-emitting hole. The present invention employs a method of vertically arranging the sealing film, thereby simplifying the molding and assembly process of the sealing film while achieving dual functionality of sound playback and vibration feedback.

Described above are only embodiments of the present application. It should be noted herein that improvements may be made for those of ordinary skill in the art without departing from the inventive conception of the present application, but these fall within the protection scope of the present application.

What is claimed is:

1. A multifunctional sounding device, comprising:

a housing with an accommodating cavity, comprising:
- an upper cover body;
- a lower cover body arranged opposite to the upper cover body; and
- a side wall connecting the upper cover body and the lower cover body, and provided with a sound-emitting hole;

a sounding driver accommodated in the accommodating cavity, comprising:
- a basket frame;
- a vibration system fixed to the basket frame; and
- a magnetic circuit system configured to drive the vibration system to vibrate along a first direction to generate sound;

a coil fixed to the housing and configured to drive the sounding driver to vibrate along a second direction, wherein the first direction is perpendicular to the second direction;

an elastic connecting member suspending the sounding driver to the housing; and a flexible sealing film provided between the sounding driver and the housing, comprising:
- an annular body portion provided between the upper cover body and the sounding driver; and
- an extension portion extending from the annular body portion to connect the sound-emitting hole.

2. The multifunctional sounding device of claim 1, wherein the annular body portion of the flexible sealing film forms a front cavity between the upper cover body and the sounding driver, and the extension portion forms a sound-emitting channel communicated with the sound-emitting hole.

3. The multifunctional sounding device of claim 2, wherein the flexible sealing film is made of silicone or hydrogenated styrene-butadiene block copolymer.

4. The multifunctional sounding device of claim 3, further comprising an upper fixing ring provided between the annular body portion and the upper cover body, and/or a lower fixing ring provided between the annular body portion and the sounding driver, and/or an outer fixing ring provided between the extension portion and the sound-emitting hole.

5. The multifunctional sounding device of claim 1, wherein the magnetic circuit system comprises a first main magnetic steel, a second main magnetic steel arranged above the first main magnet, and a sub-magnetic steel forming a magnetic gap with the first main magnetic steel and the second main magnetic steel; and the vibration system comprises a diaphragm and a voice coil arranged in the magnetic gap and configured to drive the diaphragm to vibrate to generate sound.

6. The multifunctional sounding device of claim 5, wherein the magnetic circuit system further comprises a magnetic yoke configured to support the first main magnetic steel, the second main magnetic steel, and the sub-magnetic steel; and the magnetic yoke comprises an opening provided to avoid the coil.

7. The multifunctional sounding device of claim 6, further comprising a magnet provided on a side of the coil away from the sub-magnetic steel, wherein the magnet is fixed to the magnetic yoke.

8. The multifunctional sounding device of claim 5, further comprising a circuit board and an auxiliary diaphragm arranged below the circuit board.

* * * * *